(12) United States Patent
Rothwell

(10) Patent No.: US 11,805,574 B2
(45) Date of Patent: Oct. 31, 2023

(54) HEATING ELEMENT SELECTION METHOD

(71) Applicant: NICOVENTURES TRADING LIMITED, London (GB)

(72) Inventor: Howard Rothwell, London (GB)

(73) Assignee: Nicoventures Trading Limited, London (GB)

( * ) Notice: Subject to any disclaimer, the term of this patent is extended or adjusted under 35 U.S.C. 154(b) by 1008 days.

(21) Appl. No.: 16/482,423

(22) PCT Filed: Jan. 30, 2018

(86) PCT No.: PCT/GB2018/050254
§ 371 (c)(1),
(2) Date: Jul. 31, 2019

(87) PCT Pub. No.: WO2018/142115
PCT Pub. Date: Aug. 9, 2018

(65) Prior Publication Data
US 2020/0000149 A1      Jan. 2, 2020

(30) Foreign Application Priority Data
Feb. 1, 2017 (GB) ..................... 1701633

(51) Int. Cl.
*H05B 3/00* (2006.01)
*H05B 3/12* (2006.01)
(Continued)

(52) U.S. Cl.
CPC ............... *H05B 3/12* (2013.01); *A24F 40/46* (2020.01); *G01N 21/59* (2013.01); *H05B 3/22* (2013.01);
(Continued)

(58) Field of Classification Search
CPC ... H05B 3/12; H05B 3/22; H05B 3/26; H05B 2203/017; H05B 2203/021; A24F 40/10; A24F 40/46
See application file for complete search history.

(56) References Cited

U.S. PATENT DOCUMENTS

| 4,099,607 A | 7/1978 | Brennan |
| 4,289,406 A | 9/1981 | Maddox |

(Continued)

FOREIGN PATENT DOCUMENTS

| CA | 2956377 A1 | 3/2016 |
| CN | 101347477 A | 1/2009 |

(Continued)

OTHER PUBLICATIONS

International Search Report and Written Opinion, Application No. PCT/GB2018/050254, dated Apr. 26, 2018, 13 pages.

(Continued)

*Primary Examiner* — Paul D Kim
(74) *Attorney, Agent, or Firm* — Patterson Thuente P.A.

(57) ABSTRACT

A method for obtaining a heating element for an electronic vapor provision system, the method including providing a sheet of electrically conductive porous material, directing light onto at least a portion of the sheet, detecting an amount of the light transmitted through the portion of the sheet, comparing the amount of light detected to a range of light transmission values known to correspond to a predetermined range of electrical resistance values required for the portion, and selecting the portion of the sheet for use as a heating element if the amount of detected light lies within the range of light transmission values, and otherwise rejecting the portion of the sheet.

14 Claims, 7 Drawing Sheets

(51) Int. Cl.
  *G01N 21/59* (2006.01)
  *H05B 3/22* (2006.01)
  *A24F 40/46* (2020.01)
  *A24F 40/10* (2020.01)
(52) U.S. Cl.
  CPC ........ *A24F 40/10* (2020.01); *H05B 2203/017* (2013.01)

(56) References Cited

U.S. PATENT DOCUMENTS

| | | | |
|---|---|---|---|
| 4,575,251 | A | 3/1986 | Hotta |
| 9,182,381 | B2 * | 11/2015 | Mitchell ............... G01N 25/18 |
| 10,334,885 | B2 * | 7/2019 | Baker ............... G06F 9/44505 |
| 10,897,931 | B2 * | 1/2021 | Azzopardi ............ A61M 15/06 |
| 2001/0029436 | A1 | 10/2001 | Kogaku |
| 2005/0264829 | A1 | 12/2005 | Schroeder |
| 2007/0292311 | A1 | 12/2007 | Daisuke |
| 2009/0325324 | A1 | 12/2009 | Masaki |
| 2010/0220019 | A1 | 9/2010 | Boote |
| 2013/0003063 | A1 | 1/2013 | Headley |
| 2014/0238424 | A1 | 8/2014 | Macko et al. |
| 2015/0059780 | A1 | 3/2015 | Davis |
| 2015/0090279 | A1 | 4/2015 | Chen |
| 2015/0209530 | A1 | 7/2015 | White |
| 2017/0266087 | A1 | 9/2017 | Bouarfa et al. |
| 2022/0117314 | A1 | 4/2022 | Daugherty et al. |

FOREIGN PATENT DOCUMENTS

| | | |
|---|---|---|
| CN | 201194000 Y | 2/2009 |
| CN | 101979011 A | 2/2011 |
| CN | 102125028 A | 7/2011 |
| CN | 202204753 U | 4/2012 |
| CN | 102879312 A | 1/2013 |
| CN | 103859605 A | 6/2014 |
| CN | 105394816 A | 3/2016 |
| EP | 1151751 A1 | 11/2001 |
| EP | 3158882 A2 | 4/2017 |
| GB | 2149092 A | 6/1985 |
| GB | 2416836 A | 2/2006 |
| JP | S53109933 A | 9/1978 |
| JP | 60049561 | 3/1985 |
| JP | 60050935 | 3/1985 |
| JP | 60082660 | 5/1985 |
| JP | H0650873 A | 2/1994 |
| JP | 9166561 | 6/1997 |
| JP | 2005512586 A | 5/2005 |
| JP | 2007008443 A | 1/2007 |
| JP | 2009079978 A | 4/2009 |
| JP | 2010110918 | 5/2010 |
| JP | 2014218103 A | 11/2014 |
| JP | 2017505122 A | 2/2017 |
| RU | 2015100878 A | 9/2016 |
| TW | 200812421 A | 3/2008 |
| WO | WO-2012019372 A1 | 2/2012 |
| WO | WO-2013006415 A2 | 1/2013 |
| WO | 2015117701 A1 | 8/2015 |
| WO | WO-2015114328 A1 | 8/2015 |
| WO | WO-2016005533 A1 | 1/2016 |
| WO | WO 2016023965 | 2/2016 |
| WO | WO 2016108694 | 7/2016 |

OTHER PUBLICATIONS

Bekaert, Basic Formulas for Bekipor medium, Jul. 2, 2003.
Bekaert, Bekipor web series Stainless steel metal fiber web with high porosity adapted to your needs, Feb. 2012.
Bekaert, Bekipor porous metal fibre media (2006).
Database WPI Week 197844 Thomson Scientific, London, GB; AN 1978-78926A XP002113399.
International Preliminary Report on Patentability for Application No. PCT/GB/2018/050254, dated Aug. 15, 2019, 8 pages.
International Preliminary Report on Patentability for Application No. PCT/GB2018/053140, dated Oct. 7, 2019 11 pages.
International Report on Patentability for Application No. PCT/GB2018/050253, dated Apr. 15, 2019, 18 pages.
International Search Report and Written Opinion for Application No. PCT/GB2018/050253,dated May 2, 2018, 13 pages.
International Search Report and Written Opinion for Application No. PCT/GB2018/053140, dated Feb. 6, 2019, 11 pages.
Office Action dated Apr. 14, 2020 for Russian Application No. RU2019124120, 15 pages.
Application and File History for U.S. Appl. No. 16/482,429, filed Jul. 31, 2019, Inventor: Rothwell.
Application and File History for U.S. Appl. No. 16/482,423, filed Jul. 31, 2019, inventor Rothwell.
Office action for Canadian Application No. 3051320, dated Jan. 8, 2021, 6 pages.
Office action for Canadian Application No. 3051322, dated Jan. 8, 2021, 5 pages.
Search Report for Japanese Application No. 2019-538342, dated Sep. 18, 2020, 21 pages.
Search Report for Japanese Application No. 2019-538417, dated Sep. 18, 2020, 18 pages.

* cited by examiner

| 104 | 84 | 96 | 88 | 84 | 79 | 84 | 79 | 80 | 85 | 80 | 74 | 68 | 74 | 80 | 99 |
|---|---|---|---|---|---|---|---|---|---|---|---|---|---|---|---|
| 45 | 37 | 37 | 35 | 38 | 38 | 37 | 40 | 47 | 43 | 39 | 38 | 42 | 51 | 53 | 68 |
| 51 | 39 | 38 | 40 | 39 | 44 | 45 | 42 | 47 | 47 | 46 | 41 | 47 | 56 | 54 | 61 |
| 52 | 41 | 45 | 50 | 46 | 51 | 47 | 45 | 42 | 47 | 48 | 44 | 44 | 50 | 50 | 59 |
| 55 | 41 | 44 | 48 | 47 | 50 | 47 | 51 | 47 | 46 | 47 | 46 | 44 | 47 | 48 | 49 |
| 64 | 254 | 182 | 63 | 67 | 74 | 69 | 76 | 86 | 98 | 81 | 102 | 78 | 73 | 65 | 129 |

Middle 4 Average:
45.9536

FIG. 5A

| 104 | 84 | 96 | 88 | 84 | 79 | 84 | 79 | 80 | 85 | 80 | 74 | 68 | 74 | 80 | 99 |
|---|---|---|---|---|---|---|---|---|---|---|---|---|---|---|---|
| 45 | 37 | 37 | 35 | 38 | 38 | 37 | 40 | 47 | 43 | 39 | 38 | 42 | 51 | 53 | 68 |
| 51 | 39 | 38 | 40 | 39 | 44 | 45 | 42 | 47 | 47 | 46 | 41 | 47 | 56 | 54 | 61 |
| 52 | 41 | 45 | 50 | 46 | 51 | 47 | 45 | 42 | 47 | 48 | 44 | 44 | 50 | 50 | 59 |
| 55 | 41 | 44 | 48 | 47 | 50 | 47 | 51 | 47 | 46 | 47 | 46 | 44 | 47 | 48 | 49 |
| 64 | 254 | 182 | 63 | 67 | 74 | 69 | 76 | 86 | 98 | 81 | 102 | 78 | 73 | 65 | 129 |

Middle 2 Average:
46.7265

FIG. 5B

| 104 | 129 | 133 | 162 | 194 | 227 | 270 | 302 | 344 | 395 | 433 | 467 | 498 | 546 | 603 | 676 |
|---|---|---|---|---|---|---|---|---|---|---|---|---|---|---|---|
| 45 | 37 | 74 | 109 | 148 | 186 | 223 | 263 | 311 | 353 | 393 | 430 | 472 | 523 | 576 | 644 |
| 0 | 39 | 75 | 114 | 148 | 192 | 231 | 265 | 310 | 354 | 399 | 434 | 477 | 528 | 577 | 0 |
| 0 | 41 | 84 | 125 | 160 | 199 | 238 | 276 | 307 | 354 | 401 | 444 | 478 | 527 | 575 | 0 |
| 55 | 41 | 85 | 132 | 172 | 210 | 246 | 289 | 323 | 353 | 400 | 446 | 487 | 525 | 573 | 622 |
| 64 | 309 | 222 | 148 | 199 | 247 | 279 | 322 | 376 | 421 | 434 | 502 | 524 | 560 | 591 | 702 |

FIG. 5C

HEATING ELEMENT SELECTION METHOD

PRIORITY CLAIM

The present application is a National Phase entry of PCT Application No. PCT/GB2018/050254, filed Jan. 30, 2018, which claims priority from GB Patent Application No. 1701633.8, filed Feb. 1, 2017, which is hereby fully incorporated herein by reference.

TECHNICAL FIELD

The present disclosure relates to selecting or obtaining a heating element such as for use in an electronic vapor provision system or device, for example an electronic cigarette.

BACKGROUND

Aerosol or vapor provision devices such as e-cigarettes generally comprise a reservoir of a source liquid containing a formulation, typically including nicotine, from which an aerosol is generated, such as through vaporization or other means. To achieve vaporization, a vapor provision system may include a heating element coupled to a portion of the source liquid from the reservoir. The temperature of the heating element is raised, such as by passing an electrical current from a battery through the heating element, and source liquid in contact with the heating element is vaporized. For example, a user may inhale on the system to activate the heating element and vaporize a small amount of the source liquid, which is thus converted to an aerosol for inhalation by the user.

Operation of a heating element of this type relies on the phenomenon of resistive heating, where the electrical resistance of the heating element produces a temperature rise when a voltage is applied across the heating element to cause current to flow through it. Heating elements for e-cigarettes often comprise a conductive metal wire, formed into a shape such as a coil. A porous element such as a fibrous wick is arranged in contact with the heating element (for example, the heating element is a wire wound around a rod-shaped wick) and also in contact with source liquid in the reservoir. Capillary action or wicking in the porous element carries liquid from the reservoir to the heater for vaporization.

It has been proposed that the heating and the wicking be combined into a single component. For example, if the heating element is fabricated from a sheet of electrically conductive porous material such as a metal mesh or grill, apertures in the porous structure provide a capillary action to draw liquid from the reservoir directly into the heating element for vaporization by heating when a current flows through the material.

The structure of a conductive mesh may produce irregular resistive properties, leading to uneven heating which may impact vapor production.

Accordingly, it is of interest to identify conductive porous sheet material as suitable or unsuitable for use as a resistive heating element.

SUMMARY

According to a first aspect of certain embodiments described herein, there is provided a method for obtaining a heating element for an electronic vapor provision system, the method comprising: providing a sheet of electrically conductive porous material; directing light onto at least a portion of the sheet; detecting an amount of the light transmitted through the portion of the sheet; comparing the amount of light detected to a range of light transmission values known to correspond to a predetermined range of electrical resistance values required for the portion; and selecting the portion of the sheet for use as a heating element if the amount of detected light lies within the range of light transmission values, and otherwise rejecting the portion of the sheet.

The electrically conductive porous material may comprise a mesh of metal fibers. For example, the mesh of metal fibers may comprise a mesh of sintered stainless steel fibers.

The sheet may comprise a fully or partially formed heating element, and the portion of the sheet may comprise substantially the whole sheet. Alternatively, the portion of the sheet may have dimensions corresponding to dimensions of the heating element, with the sheet having dimensions larger than the dimensions of the heating element, and selecting the portion of the sheet for use may include separating the portion from the sheet for formation into the heating element. The separating may comprise laser cutting or stamping.

Detecting an amount of the light transmitted through the portion of the sheet may comprise calculating an average transmitted light intensity for the portion, the range of light transmission values being a range of average light transmission values. The average transmitted light intensity may be an average calculated from light detected from only part of the portion. For example, the part of the portion may correspond to an expected path for current flow through the heating element when in use in an electronic vapor provision system.

The method may comprise using a light source to direct the light and using a light detector to detect the transmitted light, wherein the range of light transmission values is known to correspond to a predetermined range of electrical resistance values from a relationship between light transmission and electrical resistance derived from measurements made on samples of the electrically conductive porous material using the said light source and the said light detector, or a light source and a light detector configured to operate as the said light source and the said light detector.

The method may further comprise processing the portion of the sheet in a way that modifies its electrical resistance value. The predetermined range of electrical resistance values may be predetermined having reference to the modification in electrical resistance value to be effected by the processing.

The method may comprise using a light source to direct the light and using a light detector to detect the transmitted light, and further comprise, before providing the sheet of electrically conductive porous material: using the said light source and the said light detector, or a light source and a light detector configured to operate as the said light source and the said light detector, to detect an amount of light transmitted through each of a plurality of samples of the electrically conductive porous material; measuring the electrical resistance of each of the plurality of samples; determining a relationship between light transmission and electrical resistance using the detected amount of light and the measured electrical resistance; and extracting from the relationship the range of light transmission values corresponding to the predetermined range of electrical resistance values.

The light may have a wavelength in the range of 620 to 720 nm.

According to a second aspect of certain embodiments described herein, there is provided a method for obtaining a heating element for an electronic vapor provision system, the method comprising: providing a sheet of electrically conductive porous material; directing light onto at least a portion of the sheet; detecting an amount of the light transmitted through the portion of the sheet; comparing the amount of light detected to a predetermined relationship between light transmission values and electrical resistance values for the electrically conductive porous material to derive an electrical resistance value for the portion; and processing the portion to modify its electrical resistance value from the derived electrical resistance value towards a required electrical resistance value for a heating element.

According to a third aspect of certain embodiments described herein, there is provided a heating element for an electronic vapor provision system fabricated from electrically conductive porous material obtained using a method according to the first or second aspect. According to a fourth aspect of certain embodiments described herein, there is provided an electronic vapor provision system or a component therefor comprising a heating element according to the third aspect.

According to a fifth aspect of certain embodiments described herein, there is provided a portion of electrically conductive porous material having a light transmission characteristic and an electrical resistance value that allows it to be selected for use as a heating element for an electronic vapor provision system using a method according to the first or second aspect.

These and further aspects of certain embodiments are set out in the appended independent and dependent claims. It will be appreciated that features of the dependent claims may be combined with each other and features of the independent claims in combinations other than those explicitly set out in the claims. Furthermore, the approach described herein is not restricted to specific embodiments such as set out below, but includes and contemplates any appropriate combinations of features presented herein. For example, a method may be provided in accordance with approaches described herein which includes any one or more of the various features described below as appropriate.

BRIEF DESCRIPTION OF THE DRAWINGS

Various embodiments will now be described in detail by way of example only with reference to the accompanying drawings in which:

FIGS. 5A, 5B and 5C show grids of transmitted intensity values measured from samples of porous conductive sheet material, from which average intensity values are calculated.

DETAILED DESCRIPTION

Aspects and features of certain examples and embodiments are discussed/described herein. Some aspects and features of certain examples and embodiments may be implemented conventionally and these are not discussed/described in detail in the interests of brevity. It will thus be appreciated that aspects and features of apparatus and methods discussed herein which are not described in detail may be implemented in accordance with any conventional techniques for implementing such aspects and features.

As described above, the present disclosure relates to (but is not limited to) heating elements suitable for use in electronic aerosol or vapor provision systems, such as e-cigarettes. Throughout the following description the terms "e-cigarette" and "electronic cigarette" may sometimes be used; however, it will be appreciated these terms may be used interchangeably with aerosol (vapor) provision system or device. Similarly, "aerosol" may be used interchangeably with "vapor."

One type of heating element that may be utilized in an atomizing portion of an electronic cigarette (a part configured to generate vapor from a source liquid) combines the functions of heating and liquid delivery, by being both electrically conductive (resistive) and porous. An example of a suitable material for this is an electrically conductive material such as a metal or metal alloy formed into a fine mesh, web, grill or similar configuration having a sheet format, i.e. a planar shape with a thickness many times smaller than its length or breadth. The mesh may be formed from metal wires or fibers which are woven together, or alternatively aggregated into a non-woven structure. For example, fibers may be aggregated by sintering, in which heat and/or pressure are applied to a collection of metal fibers to compact them into a single mass.

These structures can give appropriately sized voids and interstices between the metal fibers to provide a capillary force for wicking liquid. Also, the metal is electrically conductive and therefore suitable for resistive heating, whereby electrical current flowing through a material with electrical resistance generates heat. Structures of this type are not limited to metals, however; other conductive materials may be formed into fibers and made into mesh, grill or web structures. Examples include ceramic materials, which may or may not be doped with substances intended to tailor the physical properties of the mesh.

Figure 1:
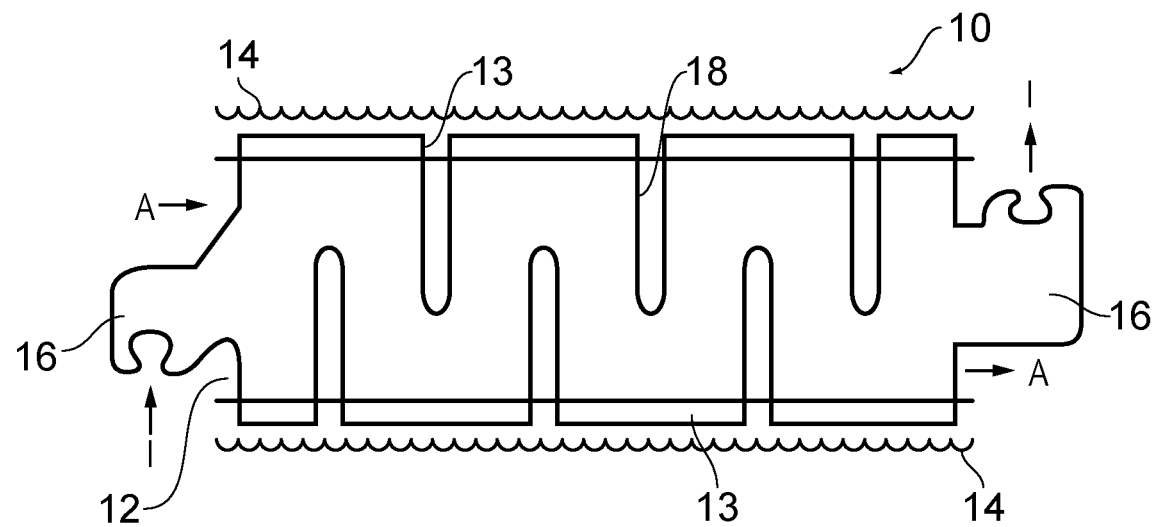
FIG. 1 shows a schematic plan view of an electrical heating element such as may be selected using methods according to embodiments.

FIG. 1 shows a plan view of an example heating element of this format. The heating element 10 is generally rectangular, with two long sides and two short sides, and planar in that its thickness into the plane of the page is many times smaller than its length or its width in the plane of the page. In use within an e-cigarette, it is mounted across an air flow channel 12 so that air travelling along the channel 12 flows over the surface of the element 10 to collect vapor. The thickness of the heating element 10 is orthogonal to the direction of air flow, shown by the arrows A. The heating element 10 is mounted such that its edge portions 13 along the long sides extends through a wall or walls defining the airflow channel 12, and into a reservoir of source liquid 14 held in an annular space surrounding the airflow channel 12. Capillary action draws liquid 14 from the reservoir towards the central region of the heating element. At its short edges, the heating element 10 has shaped connector portions 16 which are connected to electrical leads or other conducting elements (not shown) configured to pass electrical current through the heating element 10 to generate the required resistive heating, indicated by the arrows I. The heating element 10 has a series of slots 18 along its long sides, orthogonal thereto. These act to modify the current flow path away from a straight path between the connector portions 18 since the current is forced to flow around the ends of the slots. This alters the current density in these areas to form regions of a higher temperature that can be beneficial in producing a desirable vaporization action.

The heating element 10 may be formed by stamping or cutting (such as laser cutting) the required shape from a larger sheet of porous material.

The present disclosure is not limited to heating elements of the size, shape and configuration of the FIG. 1 example, however, and is applicable widely to heating elements formed from planar porous conductive materials.

Heating elements of this type may be made from a conductive material which is a nonwoven sintered porous web structure comprising metal fibers, such as fibers of stainless steel. For example, the stainless steel may be AISI (American Iron and Steel Institute) 316L (corresponding to European standard 1.4404). The material's weight may be in the range of 100-300 g/m². Its porosity may be greater than 50%, or greater than 70%, where porosity is the volume of air per volume of the material, with a corresponding density less than 50% or less than 30%, where density is the volume of fibers per volume of the material. Thickness of the material may be in the range of 75-250 μm. A typical fiber diameter may be about 12 μm, and a typical mean pore size (size of the voids between the fibers) may be about 32 μm. An example of a material of this type is Bekipor® ST porous metal fiber media manufactured by NV Bekaert SA, Belgium, being a range of porous nonwoven fiber matrix materials made by sintering stainless steel fibers.

Again, the present disclosure is not limited to heating elements made from this material, and is applicable widely to heating elements made from planar porous conductive materials. Note also that while the material is described as planar, this refers to the relative dimensions of the sheet material and the heating elements (a thickness many times smaller than the length and/or width) but does not necessarily indicate flatness, in particular of the final heating element made from the material. A heating element may be flat but might alternatively be formed into a non-flat shape such as curved, rippled, corrugated, ridged, formed into a tube or otherwise made concave and/or convex.

A consequence of manufacturing processes to make woven or nonwoven porous web structures from metal fibers is that the material may have an uneven density of fibers, giving an inhomogeneous structure and leading to uneven electrical resistivity across a sample of the material. Any irregular resistivity, i.e. localized regions with higher or lower resistivity than the average resistivity for a sample of the material, will produce a corresponding irregularity in resistive heating, in that higher resistance regions will become hotter than average and lower resistance regions will be cooler than average. For an application such as vaporization of source liquid in an electronic cigarette that relies on heating to a specified temperature (or range of temperatures for a tailored pattern of current density across a heating element) to produce a required level of vaporization, irregularities of resistance across a heating element can be undesirable. A homogeneous structure having consistent resistance may be more suitable. Completed electronic cigarette devices may fail product testing after manufacture if it is found that the heating element produces uneven heating not corresponding to a specified heating profile. Techniques for identifying in advance heating element material with appropriate resistive properties are therefore of interest, allowing unsuitable material to be rejected before it is incorporated into a complete device or component therefore.

The present disclosure proposes the use of optical analysis to test heating elements and material for making heating elements for appropriate resistive properties.

It has been found that the optical transmission of a porous conductive web material is indicative of its electrical resistance. Optical transmission is the fraction or proportion of an incident light intensity which is transmitted through an object. The web of metal fibers comprises voids and apertures, and is not solid, and hence allows some light to pass through, so its optical transmission can be measured. A denser web will transmit a lower fraction of incident light than a more open web. Also, a denser web contains more metal fibers and therefore has a lower resistance whereas conversely a more open web contains fewer metal fibers and has a correspondingly higher resistance. On combining these two properties, it has been found that there is a relationship between transmitted light intensity and electrical resistance, for samples of the same web material exposed to the same level and wavelength of incident light. Each sample has an optical transmission characteristic (amount of light it will transmit) and a value of electrical resistance, and these two properties are related. The optical transmission is proportional to the electrical resistance. For a predetermined and fixed illumination set-up, transmission is equivalent to the absolute amount of transmitted light, so the measured light intensity is also proportional to the electrical resistance. In the following, the terms "transmission" and "intensity" may be used interchangeably, except where a particular meaning is specified.

It is proposed to use this relationship to test electrical heating elements for suitability for use in an electronic cigarette. Individual heating elements which have already been separated from a larger sheet of material may be tested, and either accepted or rejected for incorporation into an electronic cigarette or part therefor. Also, regions of a large sheet of material may be tested to identify areas from which individual heating elements with suitable resistance values can be formed. The testing may comprise a simple measure of optical transmission (detecting the intensity of light transmitted through the heating element material), and comparison of the measurement with a known relationship between transmission and resistance to determine whether the measured transmission (intensity) corresponds to an acceptable or required level of resistance, such as within a range of resistance values. An upper and a lower threshold of optical intensity measurement corresponding to this resistance range can be set, for example, and any heating element for which an intensity value outside the boundaries of the thresholds is detected can be rejected from the production line, whereas heating elements that fall between the threshold values can be accepted for use. It is also possible to use the transmission-resistance relationship in a more detailed way, such as using the relationship to determine an absolute value of resistance for a sample heating element from an optical measurement, and using that information to determine additional processing steps to perform on the sample to modify the resistance to a desired value. The resistance range may therefore be a final resistance value required for a heating element, or a resistance value required as an input value for further processing of the heating element that may alter its resistance (such as changing its shape by cutting slots), or a resistance value which is known to be correctable to be within a required final range by further processing of the heating element.

Figure 2:
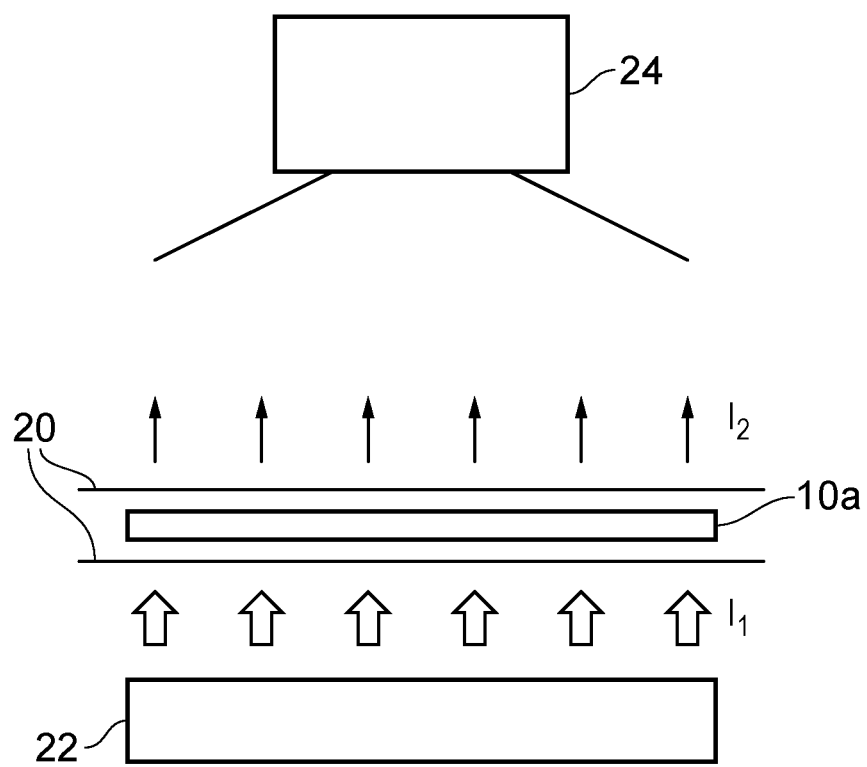
FIG. 2 shows a schematic side view of example apparatus suitable for carrying out methods according to embodiments.

FIG. 2 shows a schematic representation of example apparatus suitable for performing optical testing in accordance with an embodiment. The apparatus comprises an optical (light) source, an optical (light detector), and a means to arrange a sample for testing between the source and the detector, for example at a repeatable position for consistency between measurements. More specifically, in this example, a sample 10a of heating element material (already configured as single heater 10, or a larger sheet) is placed in position for testing. Results can be improved if the sample is held in a flat position generally perpendicular to the incident light, so if the sample shows some curling, wrinkling or other deformation (such as if it has been cut from a roll of material), it may be placed between two sheets 20 of clear plastic or glass, and secured by clamping. The sheets can be chosen to minimize optical loss through them, such as with reference to the optical characteristics of the sheet material for the wavelength of light emitted from the source 22, and/or by using very thin material. In this way, the proportion of the optical change arising from transmission through the heating element sample 10 is maximized, to improve resolution of the test.

The sample 10a is placed over a light source 22, which emits light at a first intensity I1 which is incident on the lower side of the sample 10a. Since the sample 10a occupies a finite area (i.e. it is not a point), it is desirable to test across the sample 10a in a single measurement; the whole area of the sample should therefore be exposed to the light from the light source 22. The light source can therefore be an area light source or a bar light source, capable of producing light of roughly the same intensity over an area at least as large as the area of the sample to be tested. Alternatively, one could employ a point light source with lenses to expand the optical field and flatten the intensity profile across the field. The light may be of any wavelength, as desired, and in particular can be of a single wavelength or may be a broad spectrum or white light source.

On the opposite side of the sample 10 from the light source 22 there is arranged a camera or other light detector 24. The detector 24 may comprise an array of point detectors, for example, such as a CCD array. The aim is to detect light passing from the source 22 through all parts of the sample 10a under test, so the detector area should be appropriately sized. Also, the detector 24 should be configured for detection of the particular wavelength or wavelengths of light emitted from the source 22. In other words, the detector 24 can have high sensitivity to the wavelength of the source 22.

Although the example shows the source 22 under the sample 10a, with the detector 24 above, the opposite configuration may be used so that light is directed downwardly through the sample from source to detector, or arranged in a more horizontal configuration. If the apparatus is incorporated into a production line for automated testing of heating elements being delivered for inclusion into electronic cigarettes, the configuration of the production line and the mechanism used to deliver samples to the apparatus and to reject or accept samples after testing may determine the arrangement of the components. Also it may be desired to enclose or partly enclose the apparatus to exclude stray light from the measurements.

In use, the source 22 directs a roughly uniform field of light at intensity I1 onto the sample 10a. If the sample 10a is an individual heating element, the light field as it impinges on the sample may be roughly at least the same area as the heating element, so that all parts of the sample are illuminated. If the sample 10a is a sheet from which individual heating elements are to be separated, a part of the sheet only may be illuminated, for example corresponding to the area of a single heating element. In the former case, the optical test allows a heating element to be accepted or rejected for use in a vapor provision system. In the latter case, the optical test can indicate whether a particular area of a sheet of material is suitable to be separated for use as a heating element.

The incident light field at intensity I1 impinges on the sample 10a, and part of the light is transmitted through the sample (with part being reflected/deflected/diffracted and part being absorbed), giving a reduced intensity I2 on the far side of the sample 10a. This light is detected by the detector 24, such as by photographing the illuminated sample 10a if the detector 24 is a camera. The optical transmission of the sample is I2/I1, being the fraction of incident light which is transmitted. For a fixed apparatus with constant optical output, I1 remains the same for every sample, so an absolute measurement of I2 is equivalent to the optical transmission. If the detector remains the same with fixed detection capability, the measured I2 for different samples may be compared directly to determine variation between samples.

The detected intensity I2 for a sample under test can be compared to a known, previously determined, relationship between optical transmission/intensity and resistance for the apparatus being used and the type of sample being tested, to determine/predict a resistance value for the sample under test. This value can indicate whether the sample is suitable for use as a heating element, for example if the measured intensity indicates a resistance within a range of suitable resistance values. A resistance value which is too high or too low, and therefore falls outside the range, indicates that the sample will not provide a heating element with required heating properties, so it can be rejected from further use. Alternatively, it may be marked as requiring further processing to modify the resistance value to fall within a required range.

Experiments (such as described further below) have shown that there is a linear relationship between measured transmitted light intensity and sample resistance, for a given testing configuration.

Figure 3:
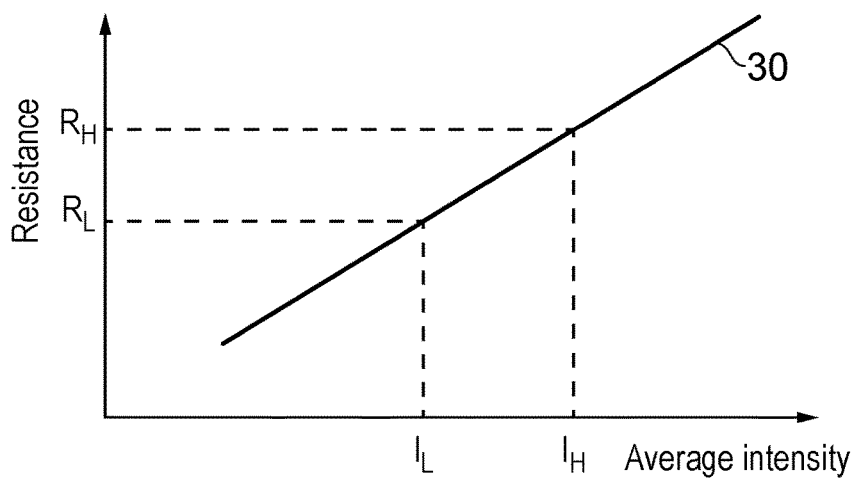
FIG. 3 shows a graph of an example relationship between optical transmission and electrical resistance.
Figure 4A:
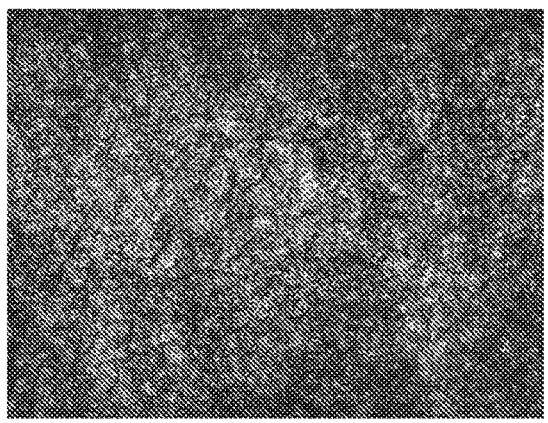
FIG. 4 shows images of porous conductive sheet material (FIGS. 4A and 4B) and corresponding 2D intensity contour maps derived from the images (FIGS. 4C and 4D).
Figure 4C:
Figure 4B:
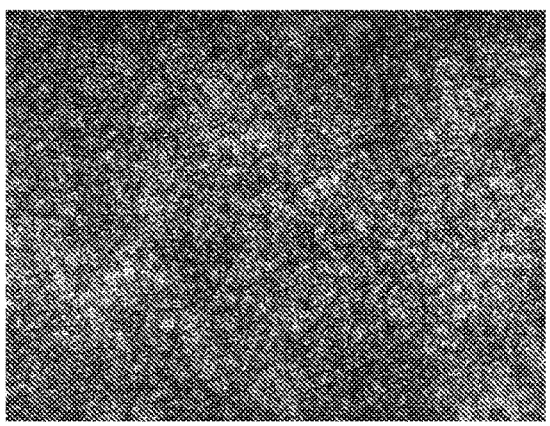
Figure 4D:
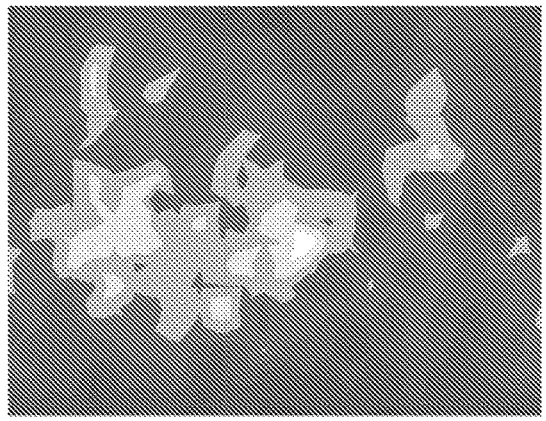

FIG. 3 shows an example graph of a relationship between transmitted intensity and resistance. The line 30 shows a linear proportional relationship. Heating element material with a higher resistivity transmits a higher proportion of incident light, so that intensity measured on the far side of a sample is higher. For a particular model or design of electronic cigarette, the heating element can be determined in advance to require a resistivity between a first value $R_L$ and a second higher value $R_H$ (for example, assuming a range of resistivities can be tolerated). An optical transmission measurement can be made on a sample heating element, and if the measured intensity falls between a first value $I_L$ and a second higher value $I_H$, corresponding respectively to the resistance values $R_L$ and $R_H$ as determined from the relationship represented by the graph of FIG. 3, it can be readily ascertained that the sample is suitable for use in the electronic cigarette. An intensity value below $I_L$ or above $I_H$ indicates that the resistivity is too low or too high (i.e. outside the range of $R_L$ to $R_H$), and the sample can be rejected.

As noted above, the transmitted light is measured across the area of the sample. If the measurement is made with a degree of spatial resolution (i.e. it is not one single measurement, for example made with a point detector into which the field of light may be directed using a lens to concentrate the light into a beam, for example), such as is obtainable using a camera or other array of detectors such as a CCD array, it can be converted into a single value intensity measurement for input into the intensity-resistance relationship. An average value can be obtained from the values recorded at the various elements in the detector array; approaches to this are discussed further below. Hence, the graph of FIG. 3 shows the relationship between average intensity and resistance.

The amount of transmitted light will depend not only on the particular sample being tested, but also on the apparatus used to perform the test and the way in which it is used. For example, the proportion of light transmitted can vary with the wavelength of light generated by the light source, and with the optical properties of any transparent sheets used to secure the sample (item 20 in FIG. 2). The amount of the transmitted light which is recorded by the detector will depend on the specification of the detector, such as its sensitivity to the wavelength of the source light, and any gain settings. Therefore, it is necessary to establish the test apparatus as comprising particular components operating under particular conditions, and ensure that each test is carried out using the established apparatus.

To obtain the resistance-intensity relationship of FIG. 3, it is also necessary to perform intensity measurements on a set of samples of a particular type of heating element material and of known resistance, using the established apparatus. The resistance for each sample in the set can be measured using an ohm meter, for example. For each sample, a pair of values for intensity and resistance is thus obtained, and the data set comprising these value pairs can be plotted on a graph and the best fit line established using mathematical modeling. This line (such as the line 30 in FIG. 3) represents the resistance-intensity relationship for the specified heating element material and sample type (size and shape, for example) when tested on the specified apparatus. Obtaining this relationship may be thought of as calibrating the specified apparatus for the specified material, the data used to generate a Figure 3-type graph being a calibration data set. To enhance accuracy, a large number of samples can be tested to yield a large data set, and multiple resistance measurements and intensity measurements can be recorded for each sample in the calibration set. Averaging of the multiple measurements per sample could also be employed.

Any subsequent sample of the specified type can then be tested using the apparatus, and the resistance value for that sample determined from the known relationship using the measured intensity value. The resistance value for a sample under test can be determined from the relationship by any available technique, including reading the value from the graph, using a look-up table of intensity and resistance values (which may require extrapolation between values in the table), or solving an equation representing the best fit line, for example of the form $R=aI+b$, where R is resistance and I is the measured (average) intensity.

Experimental Development

The following experiments have been carried out to demonstrate the proposal herein, which showed that there is a clear correlation between the resistance of a sample of porous sheet material suitable for use as an electrical heating element and its optical transmission, indicated by the proportion of light that passes through the sample. This relationship may be used to predict with accuracy the resistance of a sample, enabling the rejection of sections of material which are not expected to yield components operating within a required tolerance for resistive heating. This can reduce the number of products which require rejection late in the production process by permitting earlier rejection of faulty or defective material.

The apparatus was configured to backlight samples of material by placing the sample over a light source and directing light upwards through the sample, as in the FIG. 2 example. A 1 megapixel digital camera was used as the light detector, having a 22.5 mm variable focus lens; this was deemed to provide ample resolution. A bar light was chosen as the light source, since it was considered to provide a higher output intensity than an available area light, and a flatter lighting field than a spot light. Bar lights of three wavelengths were investigated to determine if the color of the illumination affected the quality of the information obtainable. Comparing the gain and range between the highest and lowest intensity levels in images taken of backlit samples, and the uniformity of light produced by the source, resulted in selection of a red light over a green light and an infrared light. The infrared light showed low intensity range and gain; the green and red lights were much better in these regards, with the green light showing consistently high gain. However, many cameras have higher sensitivity to red light, so the red light source was chosen for the experiments. Red light is typically defined as having a wavelength in the range of about 620 to 720 nm.

To obtain initial images in the experiments, samples of Bekipor® material (described above), which were cut to a size of 45 mm by 45 mm, were held between two sheets of clear plastic to keep them flat during imaging. The sample was held at 30 mm from the light source, and the camera positioned at 160 mm from the sample, following some testing to determine spacings for good image quality. Varying the spacings was found to have little effect on image quality, so the distances were chosen to give an appropriate field of view for the size of the samples.

Once these parameters for the apparatus were established, images of samples were taken with the camera, and processed to provide a format from which useful intensity information could be extracted.

FIG. 4 shows the results of some of this imaging. An inspection program was developed to collect the raw image data (photograph) captured by the camera into regions to each of which an intensity value is attributed, so that the data could be displayed as a 2D intensity contour map to highlight the different regions of the image. FIGS. 4A and 4B show two examples of raw images, of different samples, and FIGS. 4C and 4D respectively show the corresponding 2D intensity contour maps, where the darker areas are low intensity and the paler areas are high intensity. The light and dark areas in the original images correlate with the various regions in the contour maps. Following this process of capturing images and turning them into meaningful intensity information, it was possible to test the theory that regions in an image showing a high intensity have a higher resistance (since less conductive material is present) and regions showing a low intensity have a lower resistance (since more conductive material is present, blocking the incident light from the light source and preventing its transmission to the camera for imaging).

Accordingly, resistance testing was performed to determine the resistance of some samples. New samples of material were cut, being 45 mm by 15 mm, to mimic the dimensions of an actual electrical heating element for an electronic cigarette. Each of twenty samples was in turn held between conductive clamps, and an ohm meter was used to measure the resistance of each sample five times, and an average resistance for each sample was calculated from these measurements. The averaging was intended to take account of any variations in temperature, tension in the clamped samples, and position of the clamps.

As remarked above, the intensity values used to establish the resistance-intensity relationship are average values, being a single numeric value indicating the measured intensity of light transmitted through the finite area of a sample. Various approaches to determining a suitable representative value were considered, to see which gave the most accurate and reliable resistance-intensity relationship. The image data is divided into contiguous regions, each having a numerical value indicating the recorded intensity for that area (2D intensity contour maps such as those in FIG. 4 are graphical representations of this type of data). A first averaging method involved calculating a simple average intensity for the whole sample, across its full area, by calculating the average of all the numerical values in all the regions, although other methods to obtain an average intensity value for a whole image could be used. This method is attractively quick, as it directly outputs a single intensity value per sample which could then be directly graphed against the average resistance values.

The remaining methods use only some of the intensity values from the intensity map to calculate an average. A second method used the central two-thirds of the sample data, extending in a strip between the two short sides of a sample (where the electrical connections would be made in an actual heating element). In the resistance measurements, the ohm meter was connected to the centre of each short side, so the shortest and least resistive current path was likely to be within the central two-thirds of the sample.

FIG. 5A shows an example intensity map averaged in this way; the central two-thirds of the data regions are indicated by shading, and used to calculate an average intensity value, which is shown at the bottom of the Figure.

A third method took the average intensity of the central one-third of the sample data, based on the same reasoning as the second method, and to check whether a narrower strip of data gave substantially different results.

FIG. 5B shows an example intensity map averaged in this way; the central one-third of the data regions is indicated by shading, and used to calculate an average intensity value, which is shown at the bottom of the Figure.

A fourth method attempted to determine a path of least resistance (critical path) from one side of the material to the other, and calculate an average intensity value for the regions along this path. This was done by using shortest path analysis and using the measured intensity as a weighting factor, the darker areas (lower intensity) representing shorter paths (i.e. less resistance) and the lighter areas (higher intensity) representing longer paths (i.e. higher resistance).

FIG. 5C shows an example intensity map with its critical path highlighted; these regions were used to determine an average resistance value for the sample.

While these averaging methods have been found to be useful, other averaging techniques might be used in other embodiments.

Figure 6:
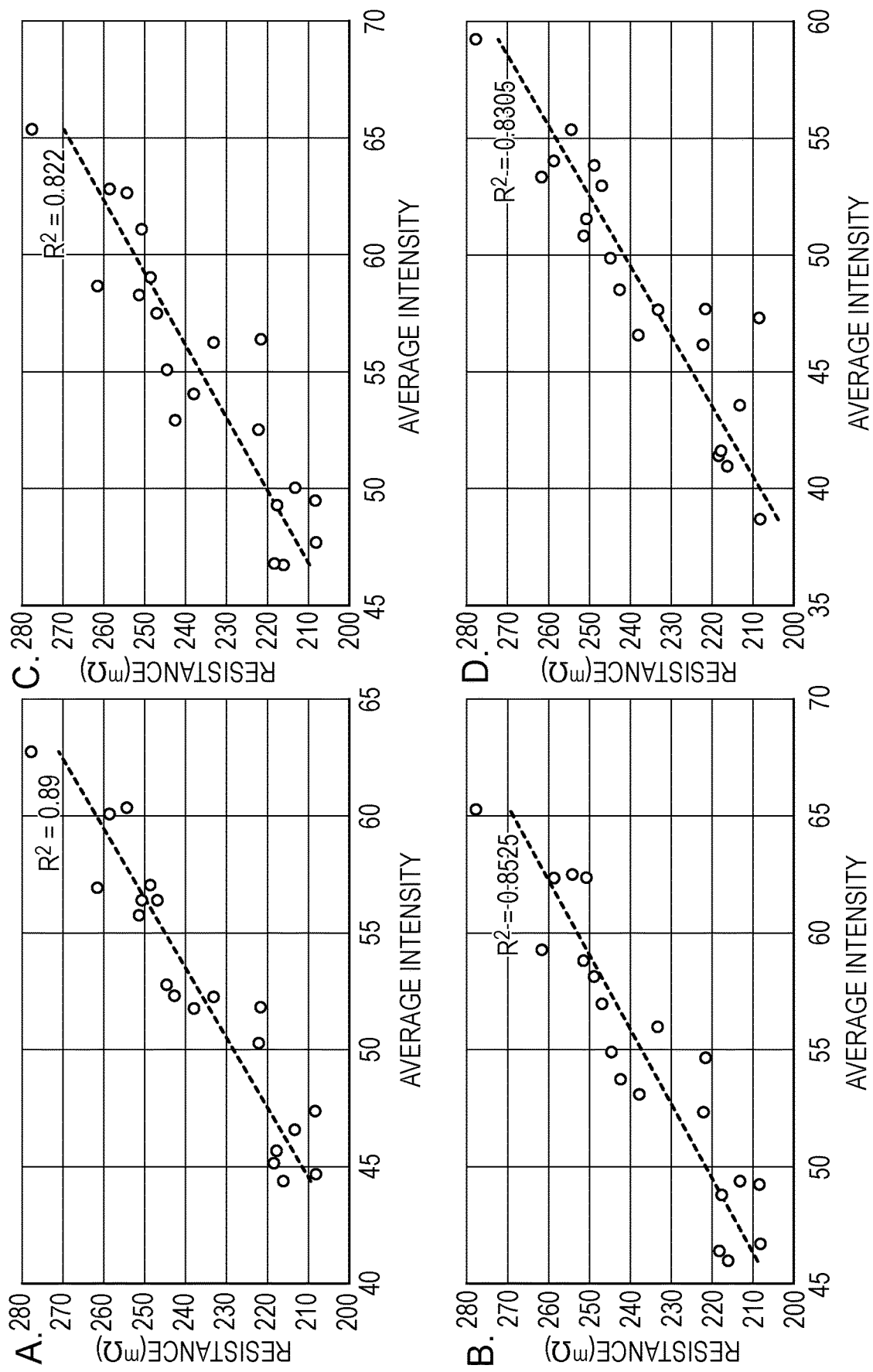
FIGS. 6A, 6B, 6C and 6D show graphs of measured average intensity values against measured electrical resistance for multiple samples of porous conductive sheet material, where the method of averaging is different for each graph.

The average intensity values for each of the twenty samples determined according each of the first to fourth methods were then plotted against the average resistance values measured for each sample, to analyze the strength of the relationship between resistance and optical transmission, FIG. 6 shows the graphs produced by this, each as a plot of average intensity against resistance. FIG. 6A shows the graph for the first method, averaging the intensity across the whole area of the sample. This data has an $R^2$ value of 0.89, where $R^2$ is the usual statistical measure of how close data lie to their fitted line, a higher $R^2$ value indicating a better fit of the data to the line. FIG. 6B shows the graph for the second method, averaging the intensity over the central two-thirds of the sample. The $R^2$ value is 0.8525. FIG. 6C shows the graph for the third method, averaging the intensity over the central one-third of the sample. The $R^2$ value is 0.822. FIG. 6D shows the graph for the fourth method, averaging the intensity along the shortest path. The $R^2$ value is 0.8305. All four methods of determining an intensity value show a strong relationship between the resistance of the sample and the intensity of the sample image, with the full area method (first method) showing the most consistent trend, indicated by the largest $R^2$ value. However, considering likely shapes of actual heating elements (see FIG. 1, for example) which are intended to provide a serpentine current path, a combination of the first method and the shortest path method may be useful. Improvement might be obtained by choosing a wider shortest path and modeling the shortest path more closely on an actual current path to give a closer approximation to the true structure of the material.

Figure 7:
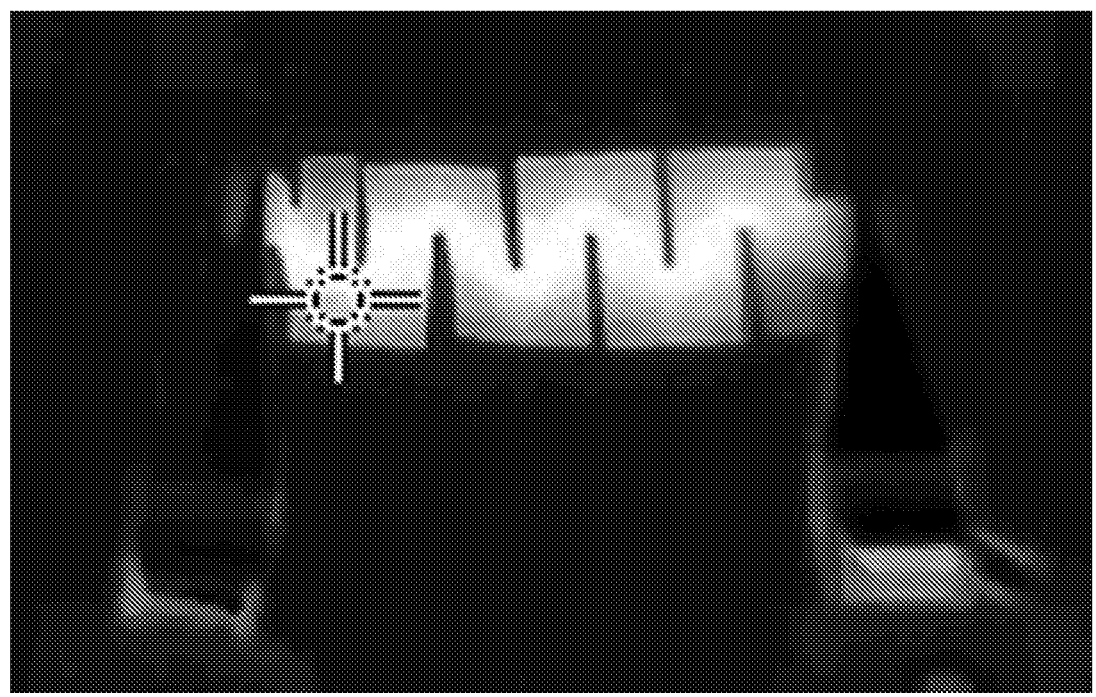
FIG. 7 shows a thermal image of a heating element made from porous conductive sheet material, carrying electrical current.

With this in mind, further experiments were carried out on a sample set of shaped heating elements, having slots cut in their long edges as in the FIG. 1 example. To determine the probable actual current path in a heating element of this kind, thermal imaging was used to capture a thermal image of a sample in use. FIG. 7 shows an example thermal image of a slotted sample with a current of 1 A applied to it. The palest parts of the image indicate the hottest parts; these are the parts in which the current density is highest, producing the most resistive heating. From this image, we can determine that the current path hugs tightly to the ends of the slots and spreads out more when traveling between the slots. With this information, the critical path method was revised to match the observed heat path as an indicator of the current path and therefore the most critical regions when determining resistance of a sample. Also, from this is evident that the second and third methods for calculating an average intensity are less applicable to a slotted heated element, because the central one-third and two-third portions include areas containing no sample material.

Using this revised intensity averaging approach, intensity values and resistance values were measured for each of one hundred sample slotted heating elements, stamp-cut from sheet Bekipor® material.

Figure 8:
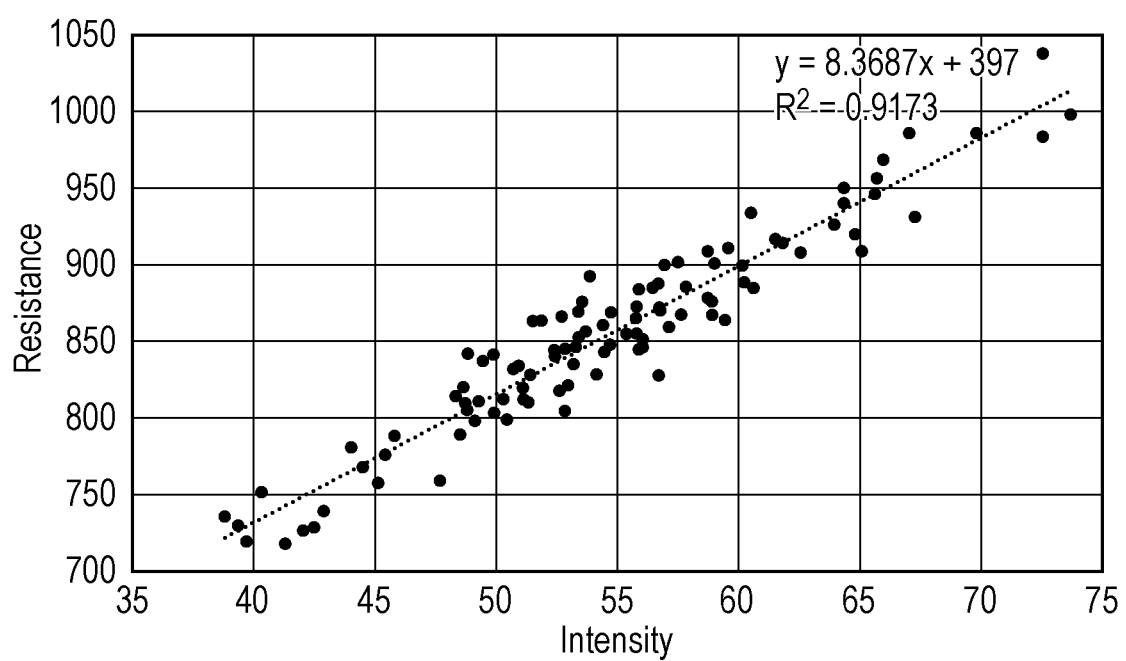
FIG. 8 shows a scatter graph of measured average intensity values against measured electrical resistance for multiple sample heating elements.

FIG. 8 shows a graph of the intensity values plotted against the resistance values for these one hundred samples. The $R^2$ value is high, at 0.9173. From this we can deduce that the relationship between intensity and resistance holds also for slotted heating element samples. Hence the proposed optical analysis is applicable to testing both plain sheet material and shaped components cut from such a sheet.

The data shown in FIG. 8 is suitable for use in assessing further sample heating elements, by measuring an intensity for a sample, then using the FIG. 8 plot to find the corresponding resistance value, and then keeping or rejecting the sample for use in an electronic cigarette according to the result, depending on whether the determined resistance falls within a predetermined range of acceptable resistance values.

Figure 9:
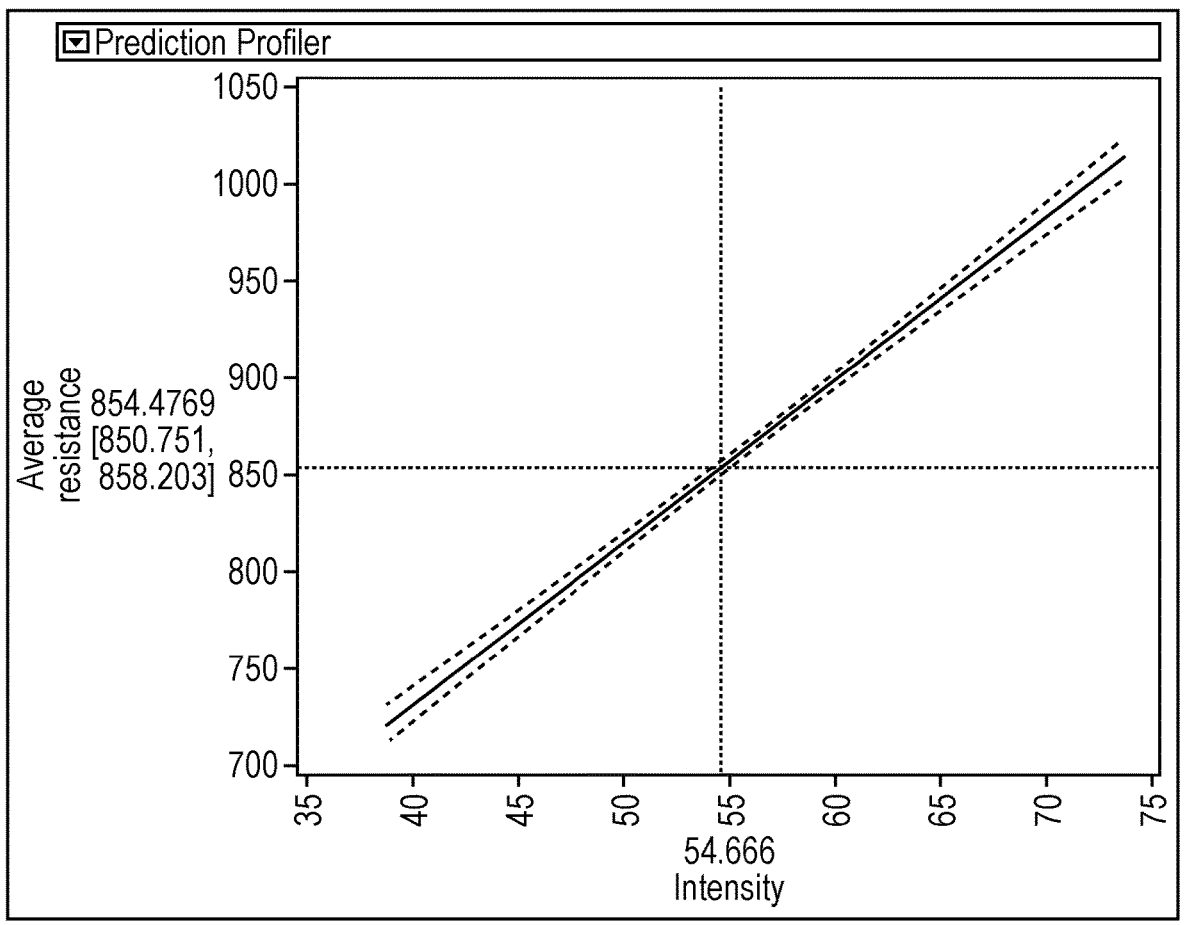
FIG. 9 shows a line graph fitted from the data shown in FIG. 8, and suitable for predicting electrical resistance for samples from which a transmitted intensity is measured.

FIG. 9 shows a plot derived from the FIG. 8 data suitable for this purpose. Compare this plot derived from real data with the example relationship illustrated in FIG. 3. As an example analysis, the vertical dotted line indicates a test sample for which an intensity measurement of 54.666 (arbitrary units) is obtained. Using the relationship recorded in the FIG. 9 plot, one can predict that the sample has a resistance of 854.4769 (arbitrary units). The sloped dotted lines indicate the expected margin of error for the resistivity value prediction; for this particular example, the upper and lower margins of error are shown in square brackets as 858.203 and 850.751.

Comparison of the graphs in FIG. 6, obtained for plain rectangular samples, and the graphs in FIGS. 8 and 9, obtained for shaped slotted samples, indicates that accurate predictions of the resistance of a sample can be made both before and after shaping of the electrical heating element (by cutting or stamping it from a larger sheet). From this we deduce that it is possible to perform accurate optical analysis of shaped samples, unshaped samples, and further, of regions within a larger sheet. Hence, using example methods described herein, one can assess sections of a porous conductive sheet material and accept or reject individual sections for further use before they are cut from the sheet. Wasted processing on defective components is thereby reduced.

Figure 10:
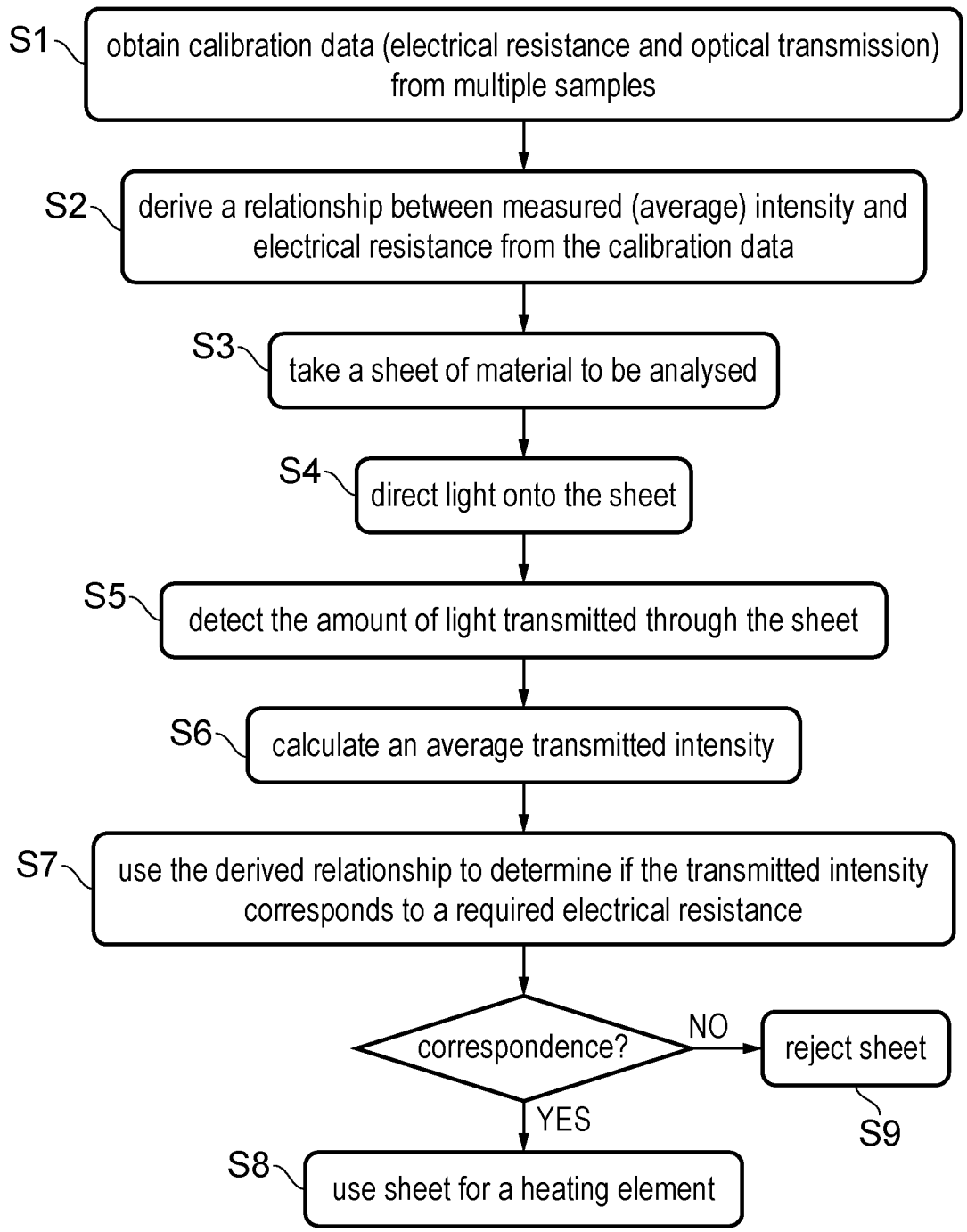
FIG. 10 shows a flow chart of an example method.

FIG. 10 shows a flow chart of an example of a method of optical analysis for testing heating elements. In S1, calibration data is obtained, comprising measurements of electrical resistance and of transmitted light intensity from a plurality of sample of porous conductive sheet material. In S2, the calibration data is used to derive a relationship between resistance and transmission, such as the graph of FIG. 9. Average intensity of each sample may be used to indicate optical transmission, where measured intensity may be averaged in any of several ways, such as those discussed above.

S3 moves the method to a test phase, for analyzing a piece of material intended to be used as a heating element. The material, in sheet form, may be a single heating element or a larger sheet from which one or more heating elements can be cut. In S4, light is directed onto the sheet, and the amount (intensity) transmitted through the sheet is detected in S5. An average value for the transmitted intensity can be calculated in S6.

In S7, the transmitted intensity value is compared with the relationship derived in S2 to test if the intensity corresponds to a value of electrical resistance required for the sheet. This may comprise determining whether the measured intensity falls within a range of intensity values known to correspond to a range of electrical resistance values which have been already predetermined for the heating element being made, for example.

If correspondence is found, in S8 the sheet is selected for use as a heating element. Further processing steps may then be implemented to produce the final form of the heating element, such as cutting the sheet into a particular shape. If there is no correspondence, indicating that the sheet has a resistance outside of an acceptable range or value, in S9 the sheet is rejected.

The above discussion has suggested that the same light source and light detector be used to obtain the calibration data set as is used to make the subsequent test measurements. While this provides good consistency and accuracy, if operation of the source and detector is maintained constant, it is also possible to use a different source and/or a different detector if they are configured to operate as the original source and detector when used in the calibration.

Thus far the proposed method has been discussed in the context of heating elements intended to operate by resistive heating in which a heating element is connected to an electrical power source so that current flows the heating element, and electrical resistance of the heating element material causes the current flow to generate heat. This can be referred to as ohmic heating or Joule heating, using the passage of a current through a conductive heating element, the current being delivered from an external power supply such as a battery in the electronic cigarette. The amount of heat generated depends on the resistance of the heating element, so use of a heating element with appropriate resistive properties is important.

As an alternative, it is possible to use induction (inductive) heating to generate heat in a heating element within an electronic cigarette. Induction heating is a phenomenon that allows heating of an electrically conductive item, typically made from metal, by electromagnetic induction. An electronic oscillator is provided to generate a high frequency alternating current that is passed through an electromagnet. In turn, the electromagnet produces a rapidly alternating magnetic field, which is arranged to penetrate the object to be heated, in this case a heating element made from a conductive porous sheet material. The magnetic field generates eddy currents in the conductive material, and this flowing current generates heat via the resistance of the material. Hence, induction heating also requires current flow to generate heat from a material's electrical resistance, but the current is an eddy current generated by an external magnetic field, rather than a current obtained by a potential difference applied from an electrical power supply. The material for the heating element is required to have appropriate resistive properties, as before.

Accordingly, examples of the proposed method are applicable to testing of heating elements and material therefore which are intended to be used with an induction heating arrangement in an electronic cigarette. For a given induction heating design, a particular resistance or range of resistance will be required, so heating elements may be tested for compliance using optical analysis as described herein.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilized and modifications may be made without departing from the scope of the claimed invention. Various embodiments of the invention may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in future.

The invention claimed is:

1. A method for obtaining a heating element for an electronic vapor provision system, the method comprising:
   providing a sheet of electrically conductive porous material;
   directing light onto at least a portion of the sheet;

detecting an amount of the light transmitted through the at least the portion of the sheet;

comparing the amount of light detected to a range of light transmission values known to correspond to a predetermined range of electrical resistance values required for the portion of the sheet; and selecting the at least the portion of the sheet for use as a heating element if the amount of detected light lies within the range of light transmission values, and otherwise rejecting the at least the portion of the sheet.

2. The method according to claim 1, wherein the electrically conductive porous material comprises a mesh of metal fibers.

3. The method according to claim 2, wherein the mesh of metal fibers comprises a mesh of sintered stainless steel fibers.

4. The method according to claim 1, wherein the sheet comprises at least a partially formed heating element, and the at least the portion of the sheet comprises substantially the whole sheet.

5. The method according to claim 1, wherein the at least the portion of the sheet has dimensions corresponding to dimensions of the heating element, the sheet has dimensions larger than the dimensions of the heating element, and selecting the at least the portion of the sheet for use includes separating the at least the portion from the sheet for formation into the heating element.

6. The method according to claim 5, wherein the separating comprises laser cutting or stamping.

7. The method according to claim 1, wherein detecting an amount of the light transmitted through the at least the portion of the sheet comprises calculating an average transmitted light intensity for the at least the portion, the range of light transmission values being a range of average light transmission values.

8. The method according to claim 7, wherein the average transmitted light intensity is an average calculated from light detected from only part of the at least the portion of the sheet.

9. The method according to claim 8, wherein the part of the at least the portion corresponds to an expected path for current flow through the heating element when in use in an electronic vapor provision system.

10. The method according to claim 1, further comprising using a light source to direct the light and using a light detector to detect the transmitted light, and wherein the range of light transmission values is known to correspond to a predetermined range of electrical resistance values from a relationship between the light transmission and the electrical resistance derived from measurements made on samples of the electrically conductive porous material using the light source and the light detector, or a different light source and a different light detector configured to operate as the light source and the light detector.

11. The method according to claim 1, further comprising processing the at least the portion of the sheet in a way that modifies its electrical resistance value.

12. The method according to claim 11, wherein the predetermined range of electrical resistance values is predetermined having a reference to the modification in electrical resistance value to be effected by the processing.

13. The method according to claim 1, further comprising using a light source to direct the light and using a light detector to detect the transmitted light, and further comprising, before providing the sheet of electrically conductive porous material:

using the light source and the light detector, or a different light source and a different light detector configured to operate as the light source and the light detector, to detect an amount of light transmitted through each of a plurality of samples of the electrically conductive porous material;

measuring an electrical resistance of each of the plurality of samples;

determining a relationship between the light transmission and the electrical resistance using the detected amount of light and the measured electrical resistance; and extracting from the relationship the range of light transmission values corresponding to the predetermined range of electrical resistance values.

14. The method according to claim 1, wherein the light has a wavelength in a range of 620 nm to 720 nm.

* * * * *